(12) United States Patent
Cocchi et al.

(10) Patent No.: US 11,076,614 B2
(45) Date of Patent: Aug. 3, 2021

(54) MACHINE FOR MAKING LIQUID OR SEMI-LIQUID PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI S.P.A.-CARPIGIANI GROUP, Milan (IT)

( * ) Notice: Subject to any disclaimer, the term of this patent is extended or adjusted under 35 U.S.C. 154(b) by 0 days.

(21) Appl. No.: 15/693,979

(22) Filed: Sep. 1, 2017

(65) Prior Publication Data

US 2018/0064135 A1 Mar. 8, 2018

(30) Foreign Application Priority Data

Sep. 7, 2016 (IT) .................. 102016000090352
Jun. 1, 2017 (IT) .................. 102017000060575

(51) Int. Cl.
  *A23G 9/28* (2006.01)
  *A23G 9/22* (2006.01)
  (Continued)

(52) U.S. Cl.
  CPC .............. *A23G 9/28* (2013.01); *A23G 9/224* (2013.01); *A23G 9/281* (2013.01); *A23G 9/282* (2013.01);
  (Continued)

(58) Field of Classification Search
  CPC ... A23G 9/28; B27D 1/08; B27D 1/21; B27D 1/888; B27D 1/22; B27D 1/36;
  (Continued)

(56) References Cited

U.S. PATENT DOCUMENTS

| | | | | |
|---|---|---|---|---|
| 3,240,395 A | * | 3/1966 | Carver | B67D 1/06 222/129.1 |
| 3,934,427 A | | 1/1976 | Keyes | |

(Continued)

FOREIGN PATENT DOCUMENTS

| | | |
|---|---|---|
| EP | 2189067 A1 | 5/2010 |
| EP | 3017702 A1 | 5/2016 |

(Continued)

OTHER PUBLICATIONS

Schomacher, Jutta De; Patent Publication WO 2007135130; Published Nov. 29, 2007; Translation retrieved from Espacenet Web Page <https://worldwide.espacenet.com/publicationDetails/biblio?ll=4&ND=3&adjacent=true&locale=en_EP&FT=D&date=20071129& CC=WO&NR=2007135130A1&KC=A1#>; Retrieved Sep. 18, 2018.*

(Continued)

*Primary Examiner* — Dana Ross
*Assistant Examiner* — Michael S. Poetzinger
(74) *Attorney, Agent, or Firm* — Shuttleworth & Ingersoll, PLC; Timothy Klima

(57) ABSTRACT

A machine for making liquid or semi-liquid products, including: a processing container for processing a basic liquid or semi-liquid product, defining a processing chamber and provided with a stirrer rotating inside the processing chamber; a thermal treatment system associated with the processing container for heating and/or cooling the processing chamber; a dispensing device which is associated with the processing container to receive therefrom the processed, basic liquid or semi-liquid product, and which is equipped with controls for delivering the processed, basic liquid or semi-liquid product to the outside of the processing container; an electronic control unit for controlling at least one actuator of the machine, a plurality of syrup containers, at (Continued)

least one heating and/or cooling device connectable to one or more of the syrup containers and/or connecting pipes and/or pumps in order to thermally treat the syrups.

4 Claims, 5 Drawing Sheets

(51) Int. Cl.
  *B67D 1/08* (2006.01)
  *B67D 1/10* (2006.01)
(52) U.S. Cl.
  CPC ......... *B67D 1/0869* (2013.01); *B67D 1/0888* (2013.01); *B67D 1/0895* (2013.01); *B67D 1/108* (2013.01); *B67D 2210/00163* (2013.01); *B67D 2210/00166* (2013.01)
(58) Field of Classification Search
  CPC .... B27D 1/44; B27D 1/06; B27D 2210/0006; B27D 2210/86; B27D 2210/91; A47J 31/402; A47J 31/404; A47J 31/46; B65D 85/78
  USPC ...................................... 99/455, 289; 62/342
  See application file for complete search history.

(56) References Cited

U.S. PATENT DOCUMENTS

| | | | | |
|---|---|---|---|---|
| 4,094,446 A | * | 6/1978 | Brutsman | A47J 27/004 219/431 |
| 4,881,663 A | * | 11/1989 | Seymour | A23G 9/282 222/132 |
| 5,159,818 A | * | 11/1992 | Etou | A23G 9/045 222/138 |
| 5,314,091 A | * | 5/1994 | Credle, Jr. | B67D 1/0021 222/129.1 |
| 2003/0012864 A1 | * | 1/2003 | Gerber | A23G 9/045 426/665 |
| 2007/0295750 A1 | * | 12/2007 | Cocchi | A23G 9/045 222/145.6 |
| 2010/0122539 A1 | * | 5/2010 | Cocchi | A23G 9/12 62/1 |
| 2010/0242497 A1 | * | 9/2010 | Bertone | A23G 9/045 62/1 |

FOREIGN PATENT DOCUMENTS

| | | | | |
|---|---|---|---|---|
| GB | 2407556 A | | 5/2005 | |
| WO | WO0234066 A2 | | 5/2002 | |
| WO | WO2005048730 A1 | | 6/2005 | |
| WO | WO-2014057433 A2 | * | 4/2014 | ............... B67D 1/07 |

OTHER PUBLICATIONS

Schomacher, Jutta De; Patent Publication WO 2007135130; Published Nov. 29, 2007; Translation retrieved from Espacenet Web Page <https://worldwide.espacenet.com/publicationDetails/biblio?ll=4&ND=3&adjacent=true&locale=en_EP&FT=D&date=20071129&CC=WO&NR=2007135130A1&KC=A1#>; Retrieved Sep. 18, 2018 (Year: 2007).*

Italian Search Report dated May 30, 2017 for counterpart Italian Application No. IT 2016000090352.

* cited by examiner

US 11,076,614 B2

MACHINE FOR MAKING LIQUID OR SEMI-LIQUID PRODUCTS

This application claims priority to Italian Patent Application 102016000090352 filed Sep. 7, 2016 and Italian Application 102017000060575 filed Jun. 1, 2017, the entirety of which are incorporated by reference herein.

BACKGROUND OF THE INVENTION

This invention relates to a machine for making liquid or semi-liquid products.

A strongly felt need in the trade concerned is that of being able to make liquid and/or semi-liquid food products using syrups contained in specific containers.

Patent document GE2003A000084 describes a machine for making ice creams or milkshakes which comprises a plurality of syrup feed pumps built into a casing of the machine itself, and syrup containers to which a pump delivery or intake section is connected.

The machine described above also comprises a chamber for processing the basic product and a dispenser in which there is an impeller and to which the outlet of the supply pumps is connected.

A particularly strongly felt need in the trade is that for ice cream or milkshake machines which allow distributing syrups or similar products (i.e. additional products) under optimum conditions at all times.

SUMMARY OF THE INVENTION

The aim of this invention is to provide an alternative machine for making a liquid or semi-liquid product, and which allows the above mentioned needs to be met.

Another aim of this invention is to provide a machine for making a liquid or semi-liquid product, specifically variegated ice cream, and which allow dressing a basic product with syrups or similar products (i.e. additional products) under optimum conditions at all times.

Yet another aim of this invention is to provide a machine for making a liquid or semi-liquid product, specifically variegated ice cream, and which is particularly simple and effective. This aim is achieved by a machine for making liquid or semi-liquid products and comprising technical features as disclosed herein.

The machine for making liquid or semi-liquid products according to the present disclosure, comprises:
- a processing container for processing a basic liquid or semi-liquid product, defining a processing chamber and provided with a stirrer rotating inside the processing chamber;
- a thermal treatment system associated with the processing container for heating and/or cooling the processing chamber;
- a dispensing device which is associated with the processing container to receive therefrom the processed, basic liquid or semi-liquid product, and which is equipped with controls for delivering the processed, basic liquid or semi-liquid product to the outside of the processing container;
- an electronic control unit for controlling at least one actuator of the machine, the machine further comprising a syrup feeding device which in turn comprises:
- at least one syrup container,
- at least one syrup feed pump connected by at least one respective pipe to the at least one syrup container and to the dispensing device to transfer syrup from the at least one syrup container to the dispensing device;
- at least one heating and/or cooling device connectable to the at least one syrup container and/or connecting pipe and/or pump in order to thermally treat the syrups.

BRIEF DESCRIPTION OF THE DRAWINGS

The technical features of the invention, with reference to the above aims, are clearly disclosed herein and its advantages are more apparent from the detailed description which follows, with reference to the accompanying drawings which illustrate a preferred, non-limiting embodiment of the invention and in which.

DESCRIPTION OF THE PREFERRED EMBODIMENTS

Figure 1:
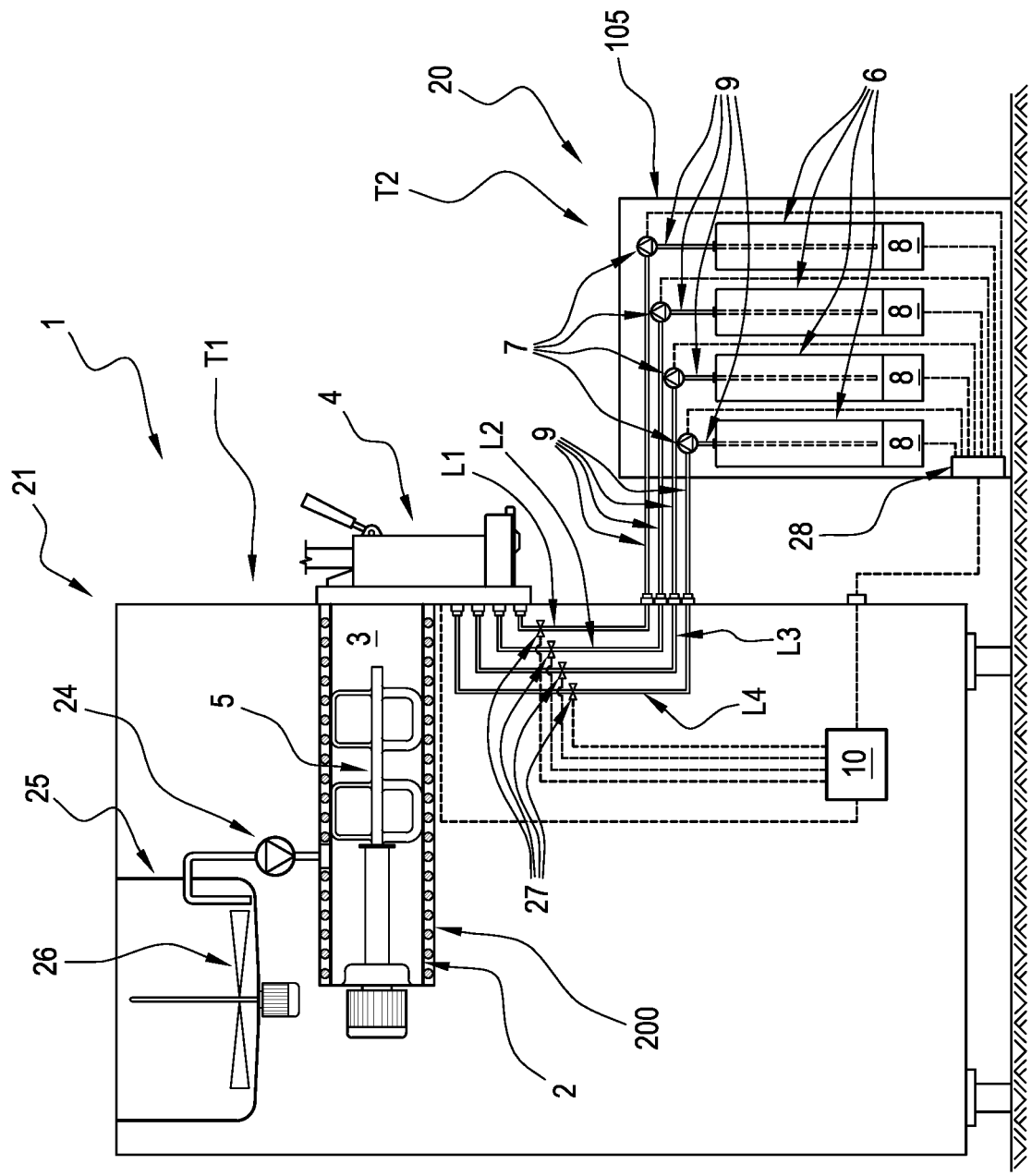
FIG. 1 is a schematic view of a first embodiment of a machine according to this invention.

With reference to the accompanying drawings, the numeral 1 denotes a machine forming the object of this invention, for making liquid or semi-liquid products.

The machine is preferably designed to make ice cream, variegated ice cream or milkshakes (or "shakes").

It should be noted that ice cream shake is generally made from a plain ice cream to which one or more additional products (hereinafter referred to as dressing syrups, or just syrups) are added.

More generally speaking, the machine 1 is designed to make a liquid or semi-liquid product (preferably a variegated ice cream) using as a basic ingredient a plain ice cream and one or more syrups.

In the context of the invention, the term "variegated ice cream" is used to mean a food preparation which is based on sugars, milk and milk-derived products and cream and to which a dressing in the form of one or more syrups is added.

According to the invention, the machine 1 comprises a production unit 21 equipped with:
- a processing container 2 for processing a basic liquid or semi-liquid product, defining a processing chamber 3 and provided with a stirrer 5 rotating inside the processing chamber 3;
- a thermal treatment system 200 associated with the processing container 2 for heating and/or cooling the processing chamber 3;
- a dispensing device 4 which is associated with the processing container 2 to receive therefrom the processed, basic liquid or semi-liquid product, and which is equipped with controls for delivering the processed, basic liquid or semi-liquid product to the outside of the processing container 2;
- an electronic control unit 10 for controlling at least one actuator of the machine 1.

The machine 1 according to the accompanying drawings further comprises a syrup feeding device which in turn comprises:
- a plurality of syrup containers 6, a plurality of syrup feeding pumps 7, each pump 7 being, in use, connected by a respective pipe 9 to one of the syrup containers 6 and to the dispensing device 4 for transferring syrup from each syrup container 6 to the dispensing device 4;

at least one heating and/or cooling device 8 connectable (or, in use, connected) to one or more of the syrup containers 6 and/or connecting pipes 9 and/or pumps 7 in order to thermally treat the syrups.

More generally speaking, the machine 1 comprises a syrup feeding device 20 which in turn comprises:

at least one syrup container 6, at least one syrup feed pump 7 connected by at least one respective pipe 9 to the at least one syrup container 6 and to the dispensing device 4 to transfer syrup from the at least one syrup container 6 to the dispensing device 4;

at least one heating and/or cooling device 8 connectable to the at least one syrup container 6 and/or connecting pipe 9 and/or pump 7 in order to thermally treat the syrups.

Figure 5:
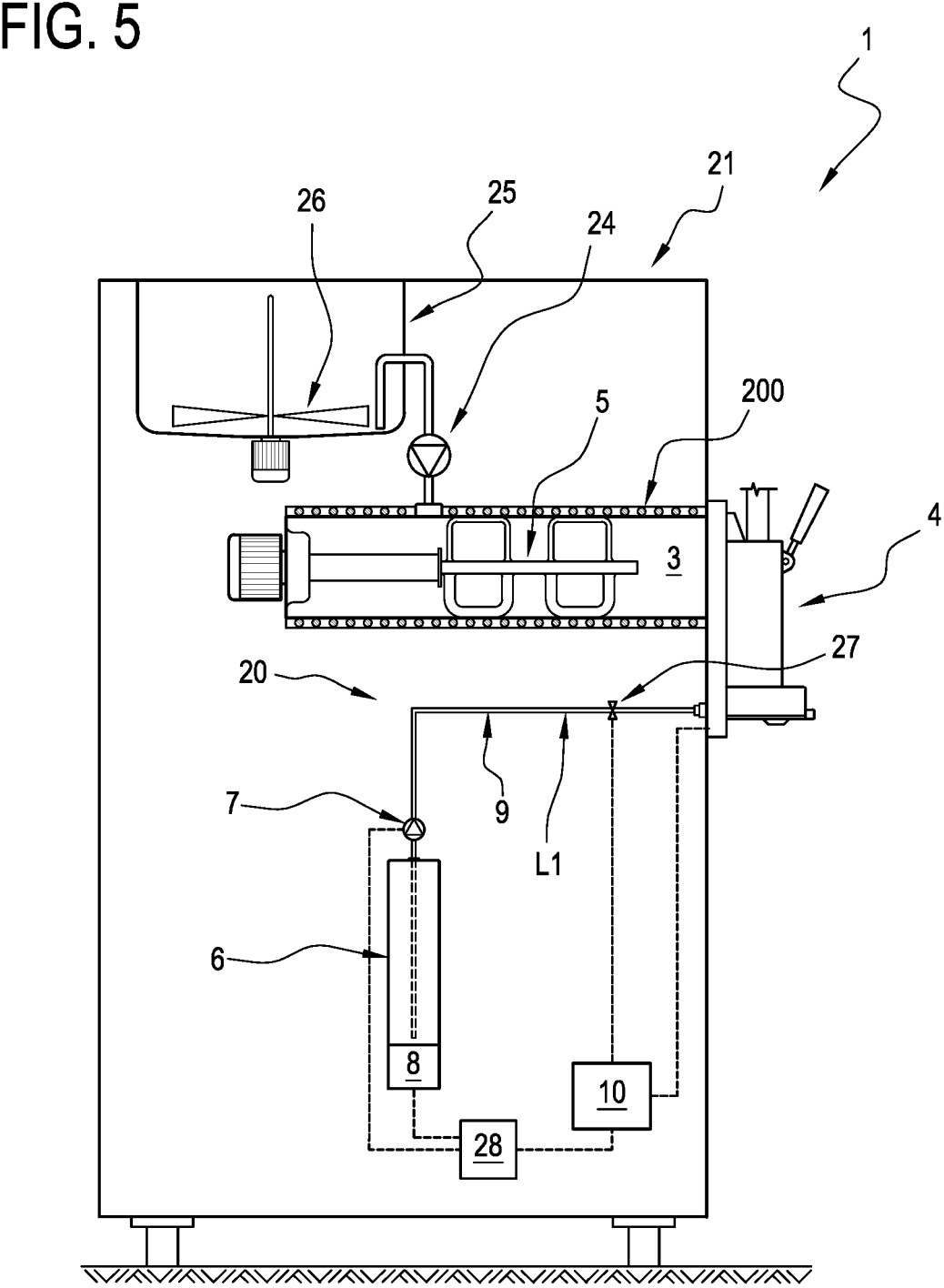
FIG. 5 is a schematic view of a third embodiment of a machine according to this invention.

FIG. 5 shows a machine 1 with a single syrup container 6, one feed pump 7, one pipe 9 and one heating and/or cooling device 8.

In the embodiment shown in FIG. 1, the syrup feeding device is independent of, and operatively connectable to, the production unit 21.

It should be noted, therefore, that in the embodiment shown in FIG. 1, the syrup feeding device is separate from, and independent of, the production unit 21: to allow the machine to operate, it is electronically connectable to the production unit 21 and the pumps 7 are also connectable to the production unit 21.

Thus, it should also be noted that since the syrup feeding device is built into the heating and/or cooling device 8, there is no need for connections to the thermal treatment system of the production unit 21.

Figure 2:
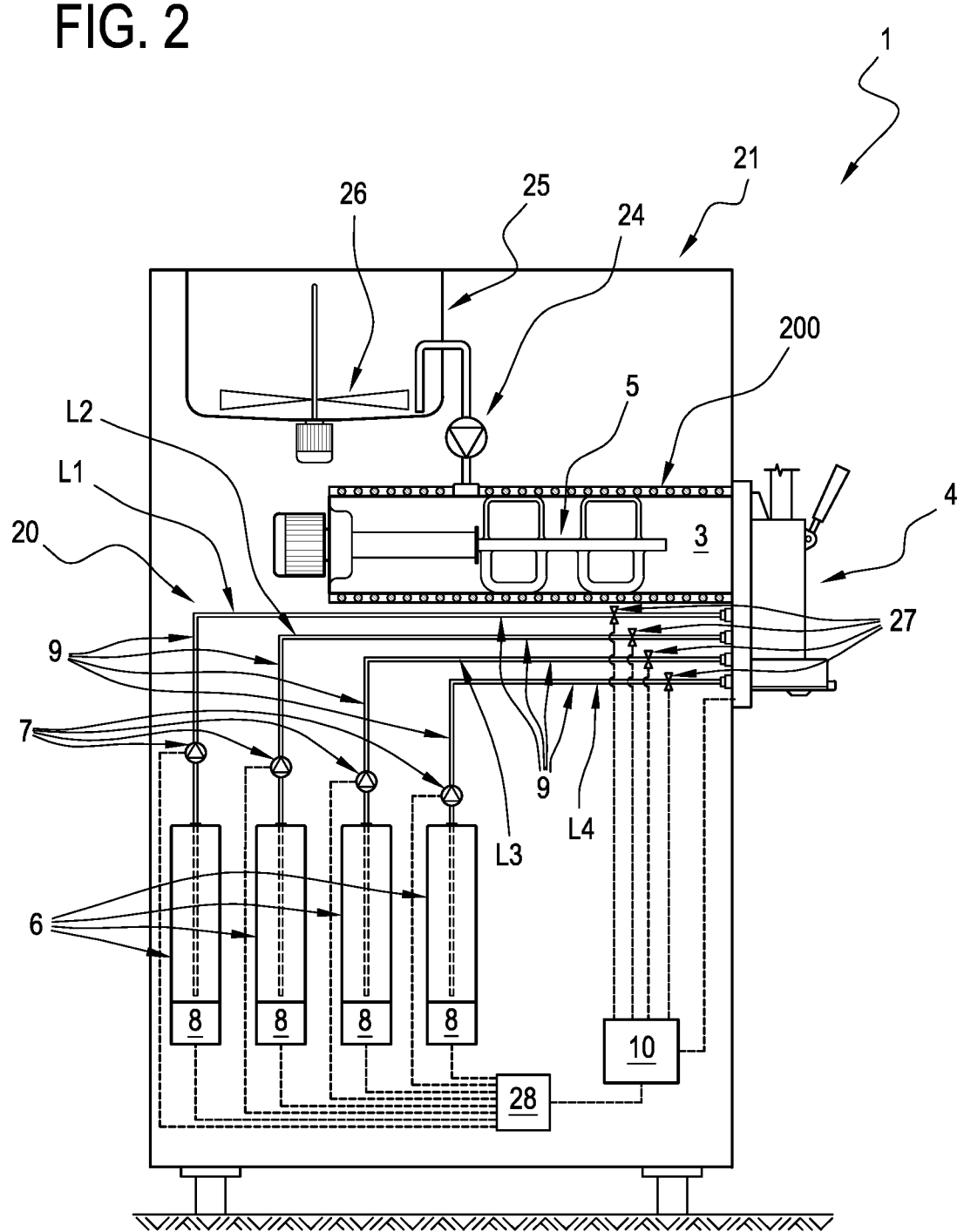
FIG. 2 is a schematic view of a second embodiment of a machine according to this invention.

In the embodiment shown in FIGS. 1 and 2, the processing container 2 is preferably a batch freezing cylinder.

It should be noted that the processing container 2 is cooled to temperatures suitable for making the neutral product (between −15° C. and −2° C.).

The thermal treatment system, therefore, is preferably configured to cool the liquid or semi-liquid product inside the processing container 2 to between −15° C. and −2° C.

Preferably, the thermal treatment system is configured to cool the liquid or semi-liquid product inside the processing container 2 to between −12° C. and −2° C.

Preferably, the processing container 2 is a cylinder with a horizontal axis.

Preferably, the processing container 2 has a circular opening on its front wall.

It should be noted that the circular opening is associated with the dispensing device 4 in such a way that the latter closes it.

It should be noted that the actuator of the machine 1, controlled by the electronic control unit 10, may comprise, by way of non-limiting example, one or more of the following elements:

the compressor of the refrigeration system;
the electrovalves of the refrigeration system;
the motors of the stirrer 5;
automatic mechanisms associated with the dispensing device 4;
the pumps 7.

It is also evident that, in use, the heating and/or cooling device 8 may be associated with the pump 7 and/or with the syrup container 6 and/or with the pipes 9 in order to thermally treat the syrup which comes into contact with these elements.

Preferably, the heating and/or cooling device 8 is, in use, associated with one or more of the syrup containers 6 and connecting pipes 9 (so that the entire syrup feed line is cooled).

It should be noted that this way, the entire syrup feed line is advantageously cooled and/or heated.

Thus, the viscosity of the syrup product is at all times the most suitable for dispensing purposes.

According to another aspect, the heating and/or cooling device 8 is, in use, associated at least with the connecting pipes 9.

Figure 4:
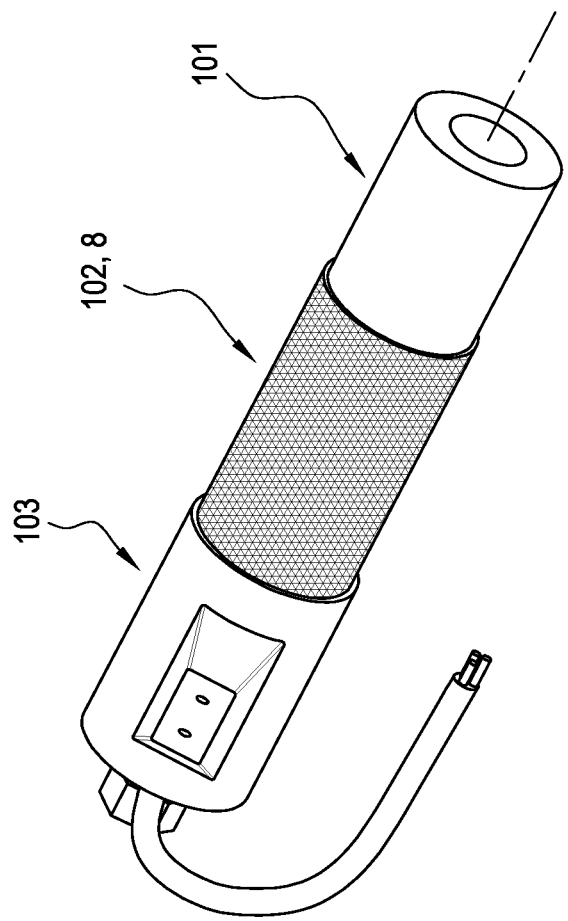
FIG. 4 is a perspective view of a detail from the preceding figures.

According to one embodiment, as illustrated in FIG. 4, the connecting pipes 9 comprise a main pipe 101 for conveying the syrups and the heating and/or cooling device 8 comprises an electrical element 102 distributed and wound around (the outside of) the main pipe 101.

Preferably, as Illustrated in FIG. 4, the machine comprises an insulating layer 103 covering (the outside of) the electrical element 102 to insulate it from the outside environment.

It should be noted that the machine preferably comprises a control unit connected to the heating device 8 to switch it on and off in such a way as to keep the syrups at a predetermined temperature.

According to another aspect, the machine 1 comprises at least one temperature sensor associated with the pipes 9 or with the containers 6 to measure the temperature of the syrups.

Preferably, according to this aspect, the control unit controls and drives the heating device 8 based on the temperature signal of the at least one temperature sensor.

Preferably, the machine comprises at least one temperature sensor for each syrup feed line, that is, for each pipe 9 coupled to a container 6.

It should also be noted that the syrup feed device 20 may comprise its own drive and control unit 28 electrically connectable to the control unit 10 of the production unit (or alternatively, the control unit 10 of the production unit may also control and drive the syrup feed device 20).

In the first case, the control unit 10 preferably acts as a "master" device, whilst the control unit 28 of the syrup feed device 20 operates like a "slave" device, that is, subject to the commands of the control unit 10 of the production unit.

It should be noted that the control unit 28 drives and controls the heating and/or cooling device/devices 8 and/or the pumps 7.

The electrical connection between the two control units (10, 28) is such that the two units can exchange electrical control and drive signals.

According to another aspect, the at least one heating and/or cooling device 8 is a Peltier cell.

Advantageously, the use of a Peltier cell allows heating or cooling to be carried out very precisely and at very specific, selected points.

Thus, the heating and/or cooling device 8 of the Peltier cell type is highly precise and reliable.

According to another aspect, the machine 1 comprises a plurality of heating and/or cooling devices 8, each associated, in use, with one of the syrup containers 6 and/or with the related connecting pipe 9 and/or feed pump 7 to thermally treat the syrups, that is to say, each associated with a syrup feed line (L1,L2,L3,L4).

It should be noted that according to this aspect, it is advantageously possible to cool and/or heat each syrup independently of the others (that is, regulate the temperature of the syrups individually).

It should be noted that some types of syrup, such as those based on chocolate, must be heated in order to be used; other syrups, such as those based on fruit, on the other hand, must normally be cooled in order to be used and/or stored.

Preferably, the heating and/or cooling device 8 is associated with the syrup containers 6 (as illustrated).

According to another aspect, as illustrated in FIG. 1, the syrup containers 6, the feed pumps 7 and the heating and/or cooling device 8 are built into a syrup feed unit which is connectable to, or disconnectable from, the dispensing device 4.

It should be noted that according to this aspect, the processing container 2, the thermal treatment system associated with the processing container 2 and the dispensing device 4 are associated with a first machine frame T1.

The first machine frame is part of the production unit.

The syrup containers 6, the feed pumps 7 and the heating and/or cooling device 8, on the other hand, are associated with a second machine frame T2, separate and distinct from the first (as illustrated in FIG. 1).

The second machine frame T2 is part of the syrup feed device 20.

According to another aspect, the syrup containers 6, the feed pumps 7 and the heating and/or cooling device 8 are connected to the same support (supporting container 105) which is connectable to, or disconnectable from, the dispensing device 4.

Preferably, but not necessarily, the at least one pump 7 is a peristaltic pump.

Alternatively, the at least one pump 7 is a volumetric pump (for example, a gear pump).

Some of the components of the machine 1 will now be better described.

More in detail—see FIGS. 1 and 2—the machine 1 comprises a basic structure (preferably in the form of a prismatic body).

As regards the container (or containers) 6 of syrup product, FIGS. 1 and 2 illustrate an embodiment in which the container 6 is simply a tank where there is a suction pipe through which the syrup is made to flow by means of a pump 7 (preferably a peristaltic pump) which (if activated) delivers the syrup along the feed duct to the dispensing device 4.

It should be noted that the dispensing device 4 defines a mixing chamber between the basic product from the container 2 and the syrups from the syrup containers 6.

The reference numeral 10 denotes a control unit and the reference numeral 11 denotes a selection or control interface usable by an operator.

The selection interface may, in particular, be configured to allow selecting the type of syrup to be delivered to the dispensing device 4.

It should be noted that the selection or control interface 11 may be of the touch-screen type or it may have one or more manual controls.

It should be noted that the dispensing device 4 comprises a mixing member 19 (located at the mixing chamber).

Figure 3:
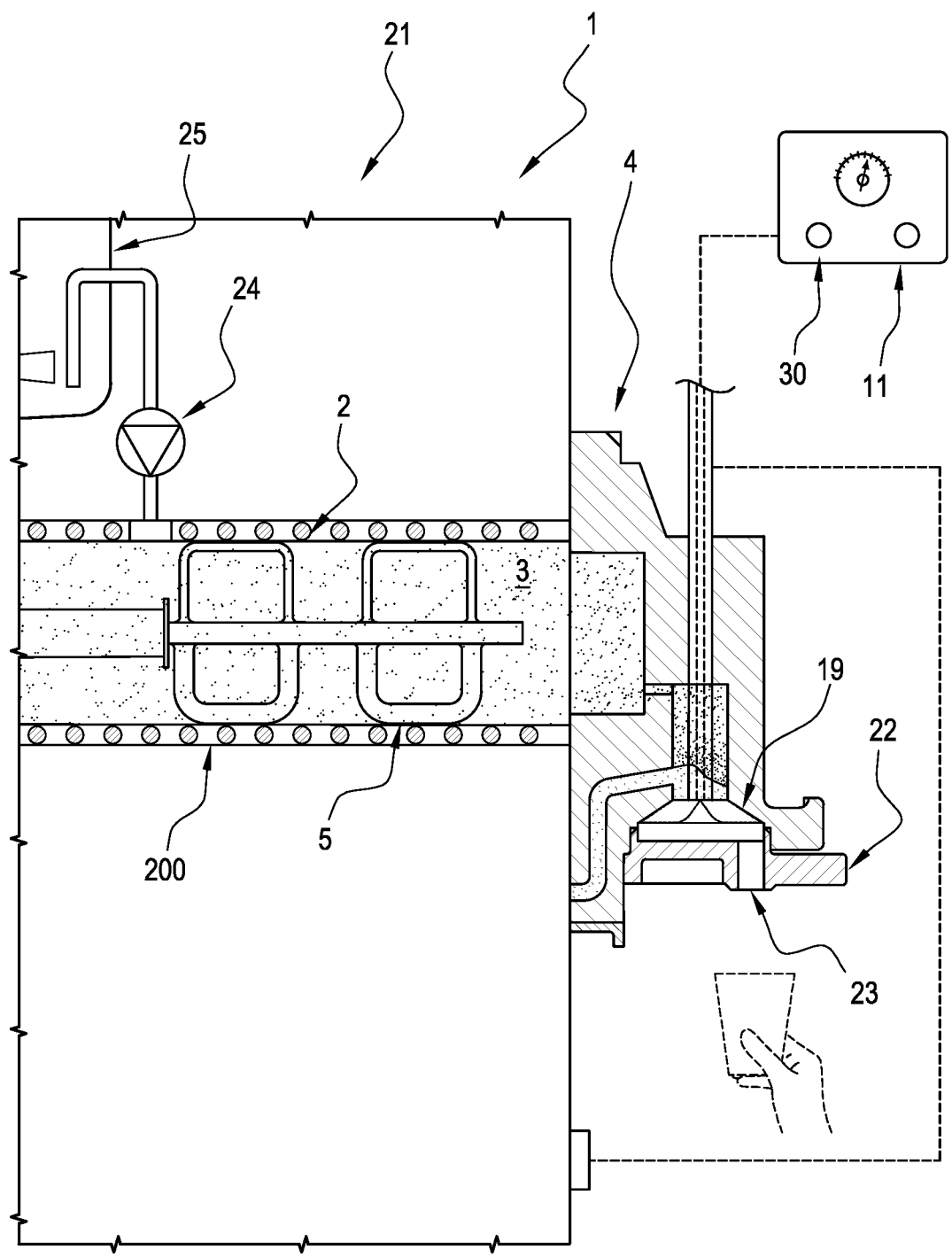
FIG. 3 is a schematic view of a detail of the machine of the invention as illustrated in the preceding figures.

The mixing member 19, as shown in FIG. 3, consists of a "whisk" (simply a whisk-like or vane tool), that is, a rotary member (or impeller) which mixes the food product in the mixing chamber.

It should be noted that the mixing member 19 is preferably movable longitudinally along a predetermined direction (vertical) between a closed position, where it closes a product outlet or delivery duct, and an open position, where it opens the product outlet or delivery duct.

More precisely, in the embodiment illustrated, the mixing member 19 acts as an element for closing/opening the outlet duct, that is to say, as a shutter.

More precisely, the top walls of the mixing chamber are shaped to be sealedly coupled to the mixing member 19.

It should be noted that the mixing member 19 is also provided with radial vanes.

Preferably, the mixing member 19 has a frustoconical shape.

The mixing member 19 is mounted at the mixing chamber; more specifically, it operates on the product at the mixing chamber itself.

It should be noted that the mixing member 19 acts on the product in the mixing chamber when in the lowered position, that is to say, the mixing member is set in rotation only when it is in the lowered position.

The mixing member 19 is connected to a rod and/or to one or more drive elements. An actuator (not illustrated) operates on the rod and/or drive elements to set the mixing member 19 in rotation.

The actuator preferably comprises a motor.

The motor is preferably driven by the control unit 10.

It should also be noted that the rod or drive elements protrude outside the closing element so as to allow moving the mixing member 19 between the lowered and raised positions.

It should be noted, in particular, that the machine 1 further comprises a shutter plate 22, located under an outlet duct of the dispensing device 4 and provided with an outlet hole 23.

The shutter plate 22 is movable between an open position where the respective outlet hole 23 is in communication with the outlet duct to allow delivering the variegated product to the outside, and a closed position where the outlet hole 23 of the shutter plate 22 does not face the outlet duct and delivery of the variegated product through the outlet duct is prevented.

The control unit 10 and the selection interface 11 are configured to allow the following operations to be carried out if the operator intends releasing variegated product into the container below, that is to say, if the operator intends making a variegated product.

If the operator (following a request from the end consumer) selects a pushbutton 30, for example, opening of the outlet duct of the dispensing device 4 is enabled and the basic flavour is thus fed from the processing container 2 to the mixing chamber.

At the same time, the pump 7 is also activated and feeds the syrup to the mixing chamber.

At this point, the mixer 19 is also activated in order to mix the basic product with the syrups inside the mixing chamber.

According to another aspect, the machine 1 allows feeding both "thin" syrup and "thick" syrup of the type used as topping.

It should also be noted that the machine 1 comprises a shutoff valve 27 which is associated with each liquid syrup transfer pipe 9 and which can be switched on or off by the control unit 11 in order to enable or disable the flow of the syrups through the related liquid syrup transfer pipe 9.

According to another aspect, the machine 1 comprises a further container 25 (shown in FIG. 1), connected to the processing container 2 to supply the basic products to the processing container 2.

Preferably, the machine 1 is equipped with thermal treatment means configured to heat or cool the walls of the further container 25.

The further container is used substantially to pasteurize the basic mixture, which is then transferred into the processing container 2.

The thermal treatment means preferably comprise a heat exchanger associated with the further container 25.

It should be noted that the machine 1 is preferably equipped with a pump 24 for transferring the basic product from the further container 25 to the processing container 2.

As illustrated, the further container 25 is provided with a stirring member 26 (schematically illustrated).

It should be noted that FIGS. 1 and 2 illustrate 4 syrup containers: generally speaking, there may be any number of syrup containers 6 greater than two.

Advantageously, the machine 1 allows storing or dispensing the additional product (e.g. the syrups) at the viscosity most suitable for dispensing purposes.

That way, the quantity of additional product delivered can be controlled in the best and most precise manner because the additional product is kept under the same conditions at all times and, furthermore (precisely because it is kept at the viscosity most suitable for dispensing purposes) dispensing problems due to clotting and clogging of the additional product are prevented.

Preferably, the heating and/or cooling device 8 keeps the additional product (e.g. syrup) at a predetermined, constant temperature.

Preferably, in the case of cooling, the temperature is between −5° C. and 10° C. and, in the case of heating, between 35° C. and 60° C.

What is claimed is:

1. A machine for making a liquid or semi-liquid product, comprising:
    a production unit including:
        a processing container for processing a basic liquid or semi-liquid product, defining a processing chamber and including a rotatable stirrer inside the processing chamber;
        a thermal treatment system thermally connected with the processing container for heating and/or cooling the processing chamber;
        a dispensing device connected to the processing container to receive therefrom the processed, basic liquid or semi-liquid product, the dispensing device including a control for delivering the processed, basic liquid or semi-liquid product to an outside of the processing container;
        at least one actuator;
        an electronic control unit for controlling the at least one actuator;
    a syrup feeding device including:
        at least one syrup container for containing a syrup,
        at least one syrup feed pump connected by at least one connecting pipe to the at least one syrup container and to the dispensing device to transfer the syrup from the at least one syrup container to the dispensing device;
        at least one heating and/or cooling device connectable to at least one chosen from the at least one syrup container, the at least one connecting pipe, and the at least one syrup feed pump in order to thermally treat the syrup;
    wherein the syrup feeding device comprises a control unit which is operatively connectable to the electronic control unit of the production unit;
    wherein the electronic control unit acts as a master unit to control the control unit of the syrup feeding device as a servant unit;
    wherein the control unit of the syrup feeding device drives and controls the at least one heating and/or cooling device;
    wherein the at least one syrup container includes a plurality of syrup containers for containing a plurality of syrups;
    wherein the at least one connecting pipe includes a plurality of connecting pipes;
    wherein the at least one syrup feed pump includes a plurality of syrup feed pumps connected by the plurality of connecting pipes to the plurality of syrup containers and to the dispensing device for transferring syrups from the plurality of syrup containers to the dispensing device;
    wherein the at least one heating and/or cooling device includes a plurality of heating and/or cooling devices, each connectable to a respective one of at least one chosen from the plurality of syrup containers, the plurality of connecting pipes, and the plurality of syrup feed pumps in order to independently thermally treat each of the plurality of syrups;
    wherein the syrup feeding device is independent of, and operatively connectable to, the production unit;
    wherein the production unit comprises a first frame and the syrup feeding device comprises a second frame separate and independent from the first frame; and
    wherein the electronic control unit is attached to the first frame and the control unit of the syrup feeding device is attached to the second frame;
    wherein the at least one heating and/or cooling device is separate and independent from the thermal treatment system;
    wherein the at least one heating and/or cooling device is, in use, thermally connected to the at least one syrup container and the at least one connecting pipe;
    a temperature sensor for each of the plurality of connecting pipes; the temperature sensor suitable for sending a temperature signal representing a temperature at the each of the plurality of connecting pipes;
    wherein the control unit of the syrup and feeding device controls and drives the at least one heating and/or cooling device based on the temperature signals from the temperature sensors for the plurality of connecting pipes;
    a shutoff valve for each of the plurality of connecting pipes which can be switched on or off by the electronic control unit to enable or disable flow of the plurality of syrups through the respective plurality of connecting pipes;
    wherein each of the plurality of connecting pipes comprises a main pipe for conveying the syrup and the at least one heating and/or cooling device includes a separate Peltier cell wound around and engaging at least a portion of a length of each respective main pipe, each Peltier being controlled by the control unit of the syrup and feeding device such that the temperature of each syrup is controlled independently of the other syrups;
    an insulating layer covering the Peltier cell.

2. The machine according to claim 1, and further comprising a supporting container independent of, and operatively connectable to, the production unit, and wherein the plurality of syrup containers, the plurality of syrup feed pumps and the at least one heating and/or cooling device are located in the supporting container which is connectable to, or disconnectable from, the dispensing device.

3. The machine according to claim 1, wherein the at least one syrup feed pump is a peristaltic pump.

4. The machine according to claim 1, wherein the at least one heating and/or cooling device also includes a respective heating and/or cooling element positioned at each of the plurality of syrup containers.

\* \* \* \* \*